(12) United States Patent
Gough (10) Patent No.: US 9,162,829 B2
(45) Date of Patent: Oct. 20, 2015

(54) CONVEYOR

(76) Inventor: George Terah Gough, Stoke on Trent (GB)

(*) Notice: Subject to any disclaimer, the term of this patent is extended or adjusted under 35 U.S.C. 154(b) by 0 days.

(21) Appl. No.: 13/641,064

(22) PCT Filed: Apr. 12, 2011

(86) PCT No.: PCT/GB2011/050721
§ 371 (c)(1),
(2), (4) Date: Oct. 12, 2012

(87) PCT Pub. No.: WO2011/128678
PCT Pub. Date: Oct. 20, 2011

(65) Prior Publication Data
US 2013/0026012 A1    Jan. 31, 2013

(30) Foreign Application Priority Data

Apr. 13, 2010   (GB) .................................. 1006075.4
Apr. 27, 2010   (GB) .................................. 1006980.5

(51) Int. Cl.
| | |
|---|---|
| *B65G 17/38* | (2006.01) |
| *B65G 21/14* | (2006.01) |
| *B65G 47/58* | (2006.01) |
| *B65G 17/12* | (2006.01) |
| *B65G 23/30* | (2006.01) |

(52) U.S. Cl.
CPC ............ *B65G 47/58* (2013.01); *B65G 17/126* (2013.01); *B65G 17/38* (2013.01); *B65G 21/14* (2013.01); *B65G 23/30* (2013.01)

(58) Field of Classification Search
CPC ...... B65G 17/126; B65G 17/38; B65G 23/30; B65G 47/58; B65G 21/14
USPC .......... 198/812, 711, 712, 844.1, 844.2, 846, 198/848, 850
See application file for complete search history.

(56) References Cited

U.S. PATENT DOCUMENTS

| | | | | |
|---|---|---|---|---|
| 3,991,632 | A * | 11/1976 | Stephens .................... | 474/241 |
| 4,722,433 | A * | 2/1988 | Gough ....................... | 198/706 |
| 6,062,379 | A * | 5/2000 | Geib et al. ................. | 198/844.1 |
| 6,142,295 | A * | 11/2000 | Greve ......................... | 198/852 |
| 6,945,386 | B2 * | 9/2005 | Bierschenk et al. ......... | 198/713 |
| 7,950,213 | B2 * | 5/2011 | Bigler ......................... | 59/84 |
| 2011/0048901 | A1 | 3/2011 | Gough | |
| 2012/0037480 | A1 | 2/2012 | Meulenkamp et al. | |

FOREIGN PATENT DOCUMENTS

| | | |
|---|---|---|
| DE | 867516 | 2/1953 |
| EP | 0352047 | 1/1990 |
| GB | 730822 | 6/1955 |
| GB | 1521967 | 9/1975 |
| GB | 2228911 | 9/1990 |
| GB | 1006075.4 | 6/2010 |
| JP | S44-5151 | 3/1969 |

(Continued)

*Primary Examiner* — Mark A Deuble
(74) *Attorney, Agent, or Firm* — Wells St. John P.S.

(57) ABSTRACT

A conveyor, such as a bucket conveyor comprising an endless belt (23), the endless belt having a length along which it is endless and comprising a plurality of generally planar sliding members (1), and a plurality of sliding couplings (6) which couple the sliding members (1) together such that each sliding member (1) can slide in a direction along the length of the endless belt over an adjacent sliding member (1) so as to vary the length of the endless belt.

15 Claims, 8 Drawing Sheets

(56) References Cited

FOREIGN PATENT DOCUMENTS

| | | |
|---|---|---|
| JP | 2007-084315 | 4/2007 |
| JP | 2013-504340 | 12/2014 |
| WO | 2009/030913 | 3/2009 |
| WO | 2009/096784 | 8/2009 |
| WO | PCT/GB2011/050721 | 7/2011 |

* cited by examiner

CONVEYOR

CROSS REFERENCE TO RELATED APPLICATION

This application is a 35 U.S.C. 5371 of and claims priority to PCT International Application Number PCT/GB2011/050721 (Publication No. WO 2011/128678 A1), which was filed 12 Apr. 2011 (12.04.11), and was published in English, and this application claims priority to GB Patent Application No. 1006075.4 which was filed 13 Apr. 2010 (13.04.10), and this application claims priority to GB Patent Application No. 1006980.5 which was filed 27 Apr. 2010 (27.04.10) and the teachings of which are incorporated herein by reference.

This invention relates to conveyors.

Conveyors of the form of endless belts or chains are well known in the prior art. An endless belt comprising a chain or rope and driven at some point along the belt can either carry goods directly on its surface or hanging from buckets or so on connected to the belt. Such a system is described in EP 0 352 047.

Chains and other belts comprising links that are jointed together are well known as requiring frequent lubrication to stop them seizing. Such lubrication is inconvenient, and undesirable where foodstuffs or other easily contaminatable goods are being transported.

It is desirable to provide for a variable pitch conveyor, where the elements carried by the conveyor (for example, buckets) can move towards or away from each other as desired. An example of such a system is known from GB 1 521 967; this system makes use of a chain of links, which collapse together in a concertina fashion when it is desired to decrease the pitch of the endless belt. The belt therefore takes up much more space in the lower-pitch state. It also has the other disadvantages of a chain link system described above.

According to a first aspect of the invention, there is provided a conveyor comprising an endless belt, the endless belt having a length along which it is endless and comprising a plurality of generally planar sliding members, and a plurality of sliding couplings which couple the sliding members together such that each sliding member can slide in a direction along the length of the endless belt over an adjacent sliding member so as to vary the length of the endless belt.

Accordingly, a conveyor can provided with variable pitch, without having to have the endless belt bunch or otherwise deviate from its normal path.

Each of sliding members may be connected to an adjacent sliding member by means of one of the sliding couplings. The pitch of the sliding couplings when the endless belt is extended to its maximum length may be substantially constant.

Each sliding coupling may comprise at least one first part, attached to a first sliding member, slidably mounted in an elongate slot in a second sliding member. The elongate slot may be entirely within a body of the second sliding member, or may be formed in a lateral edge of the sliding member. The first part may comprise a pin, such as a rivet, attached to the first member. Alternatively or additionally, the first part may comprise a portion of the first sliding member bent out of the plane of the first sliding member. As such, each elongate slot may comprise two ends spaced along the length of the sliding member, with the first part free to slide in the slot between the two ends.

There may be at least three, and typically four, such elongate slots, the elongate slots being mutually parallel but non-collinear. The slots may be parallel to the length. This allows the sliding members to slide in the direction of the slots (typically along the length of the endless belt) whilst reducing the possibility of the sliding members twisting relative to one another. This therefore reduces the chances of the endless belt bunching. Typically, at least one of the slots will be displaced along the length of the endless belt from the other slots.

An end of at least one of the slots may be provided with an end stop, which protrudes from the plane of the sliding member. This may comprise a portion of the sliding member that is bent out of the plane of the remainder of the sliding member. The end stop of a given sliding member may be such that it interferes with a member fixed to the sliding member to which the given sliding member is attached.

The or each first part may be capped by a capping member; the first part may pass from a first side of one sliding member, through the slot of a second sliding member and then be capped by the capping member. The capping member may be the part with which the end stop interferes.

The conveyor may further comprise a set of rotatable pulleys on which the endless belt is mounted. At least some of the pulleys may be drive pulleys, which are provide with drive means to drive rotation of those pulleys and so move the endless belt. The pulleys may comprise sprockets which engage drive positions on the endless belt. These drive positions may comprise drive slots formed in the endless belt, typically in the sliding members, or drive trunnions attached to the endless belt, typically to the sliding members.

The conveyor may therefore be able to change the pitch of the sliding members by controlling the level of tension or compression along the length of the endless belt. Typically, by applying compression along the length of the endless belt, the pitch of the sliding members may be reduced, whereas by applying tension the pitch of the sliding members may be increased. In the preferred embodiment, containment means are provided in any area of compression, so as to define a path for the sliding members and to ensure that they do not pass out of the path.

The conveyor may therefore comprise at least one pair of compression pulleys, which act to compress the endless belt as the endless belt passes between them. One of the pair of compression pulleys may act as a drive pulley; this may be the pulley of the pair which the endless belt passes over first as it circulates. The compression pulleys may be connected together so as to rotate at the same speed; this ensures that a consistent number of sliding members are contained between the two compression pulleys.

Additionally, the conveyor may comprise a pair of tension pulleys, which act to tension the endless belt as the endless belt passes between them. One of the pair of tension pulleys may act as a drive pulley; this may be the pulley of the pair which the endless belt passes over last as it circulates.

The endless belt may be provided with support for carriers, such as buckets. A carrier may be provided on each sliding member, or at a regular period on the sliding members. Thus, a change of pitch of the sliding members will cause a change in pitch in the carriers. For example, carriers such as buckets can be brought together when loading and separated when they need to be tipped (rotation of the buckets requiring clearance between the buckets) for discharge of their contents. Each support may comprise an arm fixed to a sliding member and a fixing point for the carrier.

The carrier may be pivotable relative to the support about an axis, which may be either in the plane of the endless belt (typically perpendicular to the length of the belt) or parallel thereto but offset therefrom. In the latter case, the support may comprise a crank arm, which offsets a pivot point for the carrier from the belt. This may have the effect that the pitch of the buckets will vary depending upon curves that the belt encounters and so the path of the endless belt can be used to vary the pitch of the carriers.

The endless belt may also be provided with carriers, such as buckets, carried on the carriers, typically attached by means of the fixing point.

The conveyor may comprise two such endless belts, positioned with their lengths generally parallel to one another, and tie bars connecting the two endless belts at intervals along the length of the conveyors.

Thus, the running of the two endless belts can be stabilised by the use of tie bars. Typically, the tie bars will extend generally perpendicular to the length of the endless belts. The tie bars may connect the two endless belts at regular intervals along their lengths, typically such that the tie bars connect at a consistent point to the sliding members.

Where the conveyors are provided with carriers, the carriers may also connect the two conveyors together, such that the tie bars provide extra support for the conveyors during movements of the carriers.

According to a second aspect of the invention, there is provided a conveyor comprising an endless belt, the endless belt having a length along which it is endless and comprising a plurality of generally planar members and a plurality of carrier supports carried by the planar members, in which each carrier support is arranged to provide pivoting support for a carrier and defines a pivoting axis for the carrier to pivot about, in which the pivoting axis is parallel to but offset from the plane of the planar members.

Such a carrier means that the spacing of the carriers carried on the carrier supports will vary depending on the curvature of the endless belt. The curvature of the endless belt can therefore be used to vary the pitch of the carriers.

Typically, the conveyor will comprise carriers pivotally mounted on the carrier supports so as to pivot about the pivoting axes. The carriers will typically be buckets.

The planar members may be fixed together, or may be slidable over one another as in the first aspect of the invention.

There now follows, by way of example only, an embodiment of the invention, described with reference to the accompanying drawings, in which.

Figure 1:
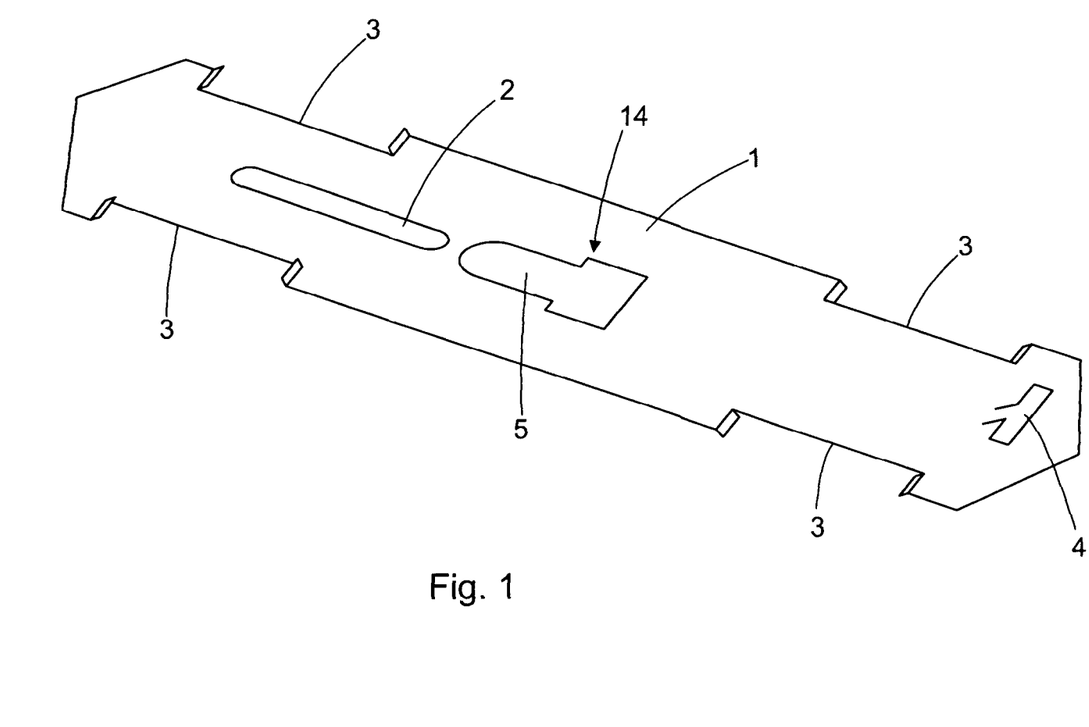
FIG. 1 shows one of the sliding members of a conveyor of an embodiment of the invention, in isometric view.
Figure 2A:
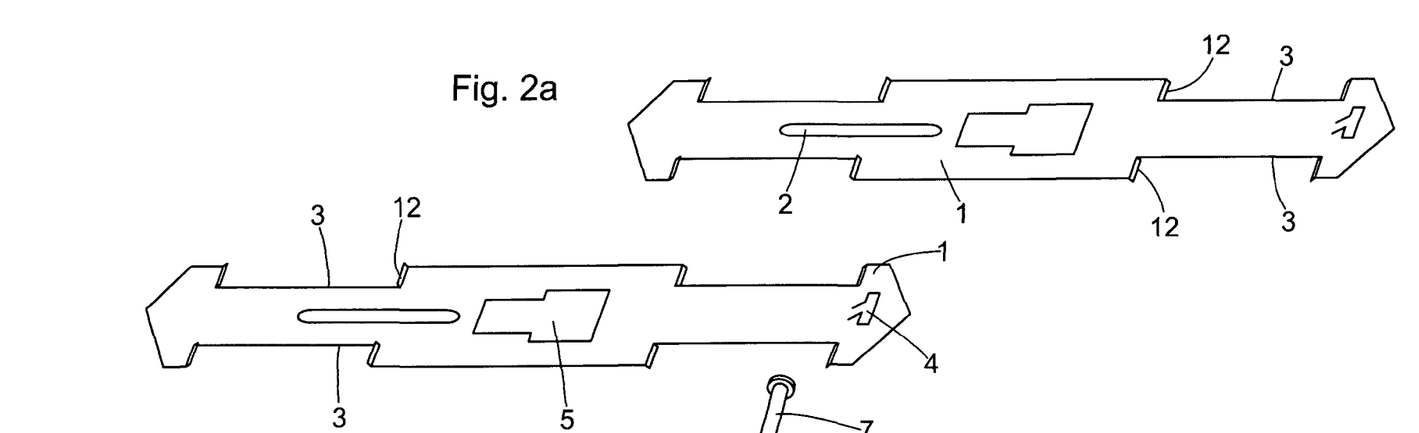
FIGS. 2a to 2c shows the connection of two sliding members of FIG. 1, in exploded side elevation.
Figures 2B, 2C:
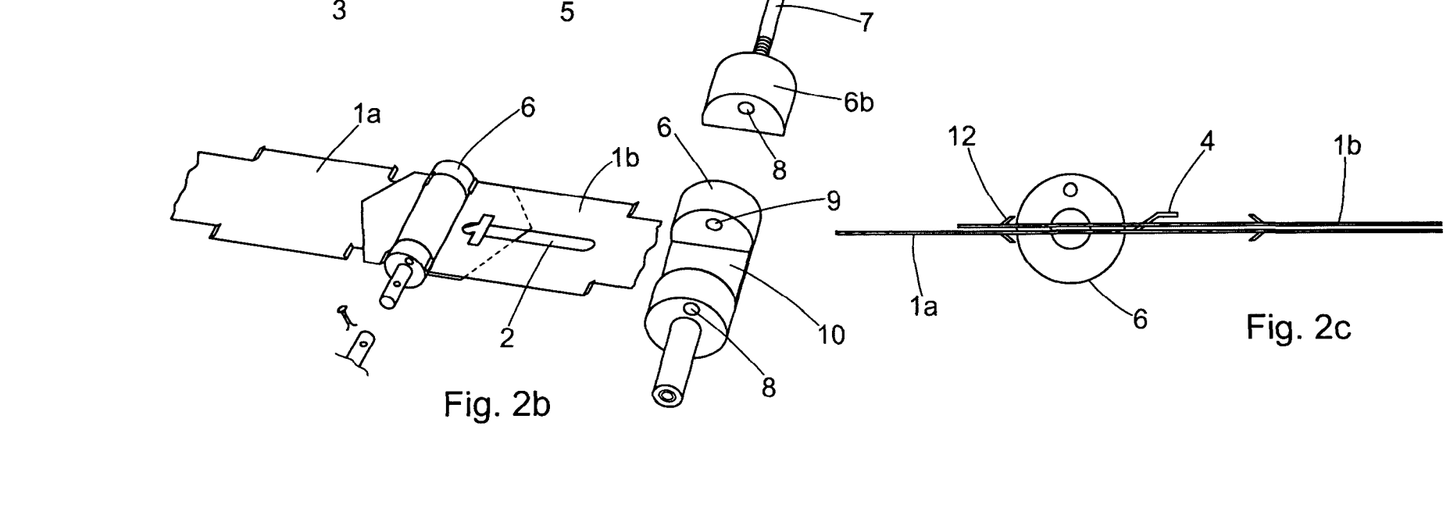

FIGS. 1 and 2 of the accompanying drawings depict a plurality of sliding members 1 which can be joined together in a sliding, overlapping fashion as described below in order to form a conveyor. Each sliding member is of the form of an elongate strip of spring steel. Five slots are provided in each sliding member 1, parallel to the length of the sliding member 1; one internal slot 2 formed on the midline of the sliding member 1, and four lateral slots 3 each formed as a cut-out out of the side of the sliding member. The four lateral slots 3 form two pairs, each defining a narrowed section of the body of the sliding member 1. A T-shaped cut-out portion 4 is bent out of the plane of the sliding member 1.

The sliding members 1 are joined together by means of a sliding coupling 6. This sliding coupling 6 is of the form of a generally cylindrical body, with a cut-out section 10 sized to fit the narrowed sections between each pair of the lateral slots 3. An insert 6b fits in the cut-out section 10. In order to slidingly join two sliding members 1 together, the narrowed section of one end of a first sliding member 1a is inserted within the cut-out section 10, on top of which is placed the narrowed section of the other end of a second sliding member 1b. The insert 6b is then inserted into the cut-out section 10 to fill the remaining space. A pin 7 is passed through a hole 9 in the body of the sliding coupling 6 and a hole 8 in the insert 6b, to secure the sliding coupling 6 in place.

In addition, the T-shaped cut-out portion 4 of the first sliding member 1a is received through the medial slot 2 of the second sliding member 1b, so that the head of the T is positioned on the other side of the second sliding member 1b from the first sliding member 1a.

As such, this sliding coupling allows the sliding members 1a, 1b to slide over one another along their length, but restricts any other movement (for example twisting) due to the arrangement of the sliding coupling 6 and the T-shaped portion 4 in the slots 2, 3. The positions of the ends of the slots control the amount that the sliding members 1 can slide over each other.

The sliding coupling 6 further acts as a capping member. When at the end of the slots 3, it engages a bent portion 12 of the distal end of the lateral slots 3, which extends out of the plane occupied by the remainder of the sliding member 1, when the two sliding members are at maximum extension from one another.

FIGS. 3a to 3f of the accompanying drawings show a carrier support 13 used to support a carrier such as a bucket (not shown) on the sliding member. A drive slot 5 is provided in the centre of each sliding member 1, which is symmetric along the median line of the sliding member, but has a step 14 in width, such that the drive slot 5 has a wide 5a and narrow 5b part. Each lateral edge of the sliding member 1 adjacent to the wider part 5a is formed with a further slot (only shown in FIGS. 3d and 3e), so as to reduce the width of the remaining part of the body of the sliding member 1 at that point.

Around the sliding member 1 about this slot 5 is fitted a drive trunnion 13 of the form of a generally cylindrical plastic body. This cylindrical body is provided with two cut-out portions 16, which are as wide as the remaining body of the sliding member 1 at the wide part 5a of the slot 5. However, in the base of each cut-out portion 16, there is a blind rebate 17 to increase the width of the cut-out portion 16 for part of its length.

This arrangement means that the trunnion 13 can be slipped over the wide part 5a of the slot 5, with the body of the sliding member 1 being received in the cut-out portions 16, and then slid along the slot 5 to the narrow part 5b. The step 14 will then engage the each of the rebates 17. This means that, when the sliding member is forced in the drive direction—that is, the direction to the left in FIG. 3d-force will be transmitted from the sliding member 1 to the trunnion 13 through the step 14. A tab 18 formed in the lateral edge of the sliding member 1 can be used to secure each side of the trunnion, by bending the same out of the plane of the sliding member 1.

Figure 3A:
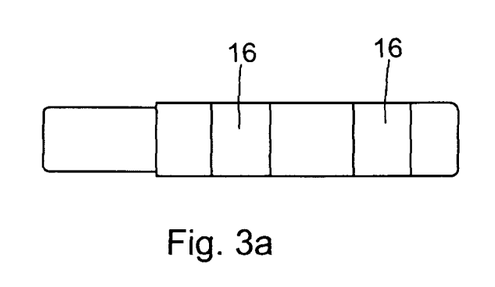
FIGS. 3a to 3f shows a plan view of a carrier support mounted on the sliding member of FIG. 1.
Figures 3B, 3C:
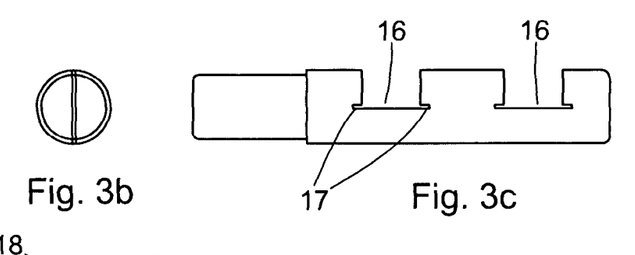
Figures 3D, 3F:
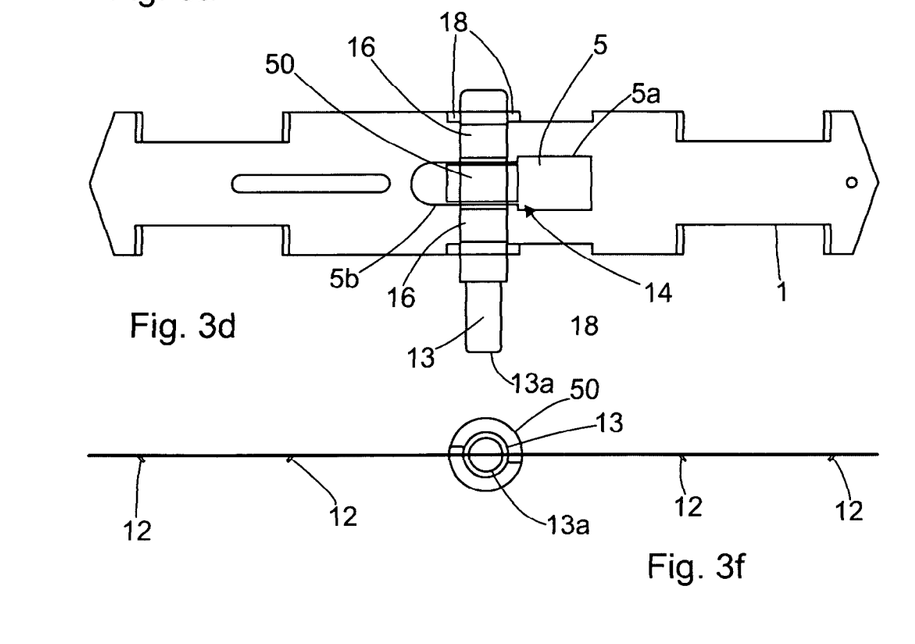
Figure 3E:
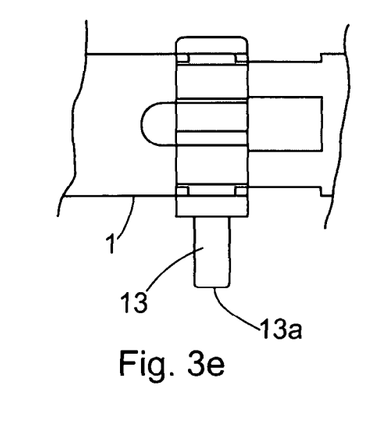
Figures 4A, 4B:
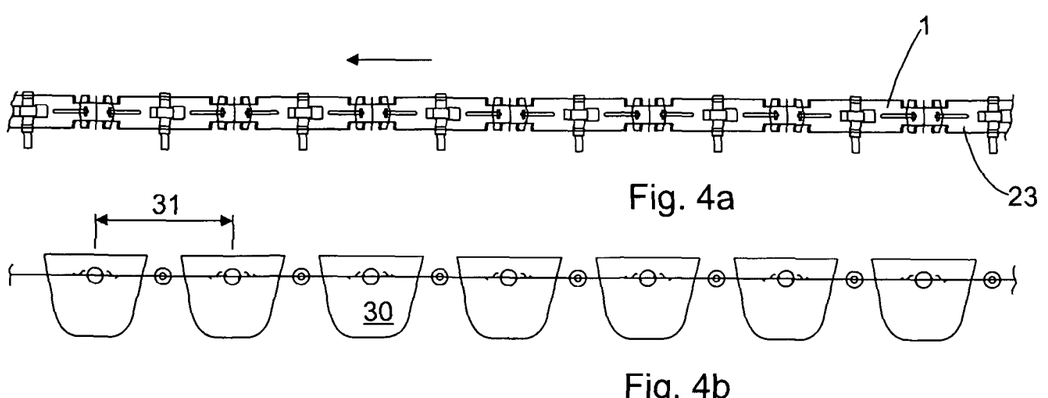
FIGS. 4a to 4d shows a conveyor according to an embodiment of the invention, made up of a plurality of the sliding members of FIG. 1, in expanded (FIGS. 4a and 4b) and collapsed (FIGS. 4c and 4d) states.
Figure 4C:
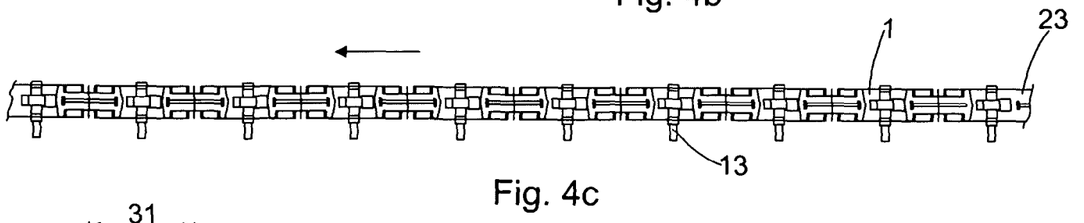
Figure 4D:
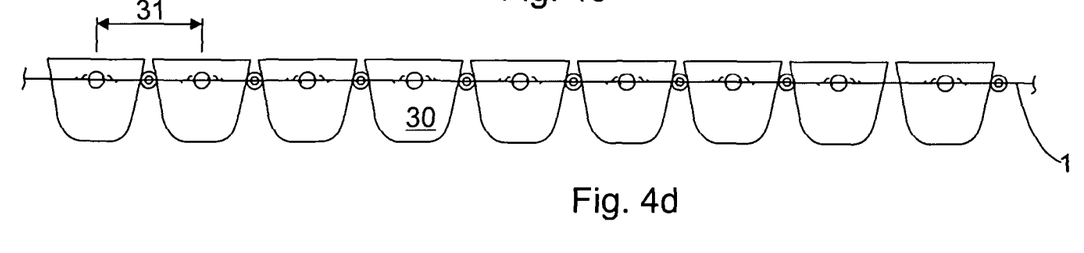

Normally, a wheel 50 is placed over the trunnion 13; however, as shown in FIG. 3e, this is optional. Carriers, such as buckets, can be carried on an arm 13a extending from the trunnion 3.

Figure 6:
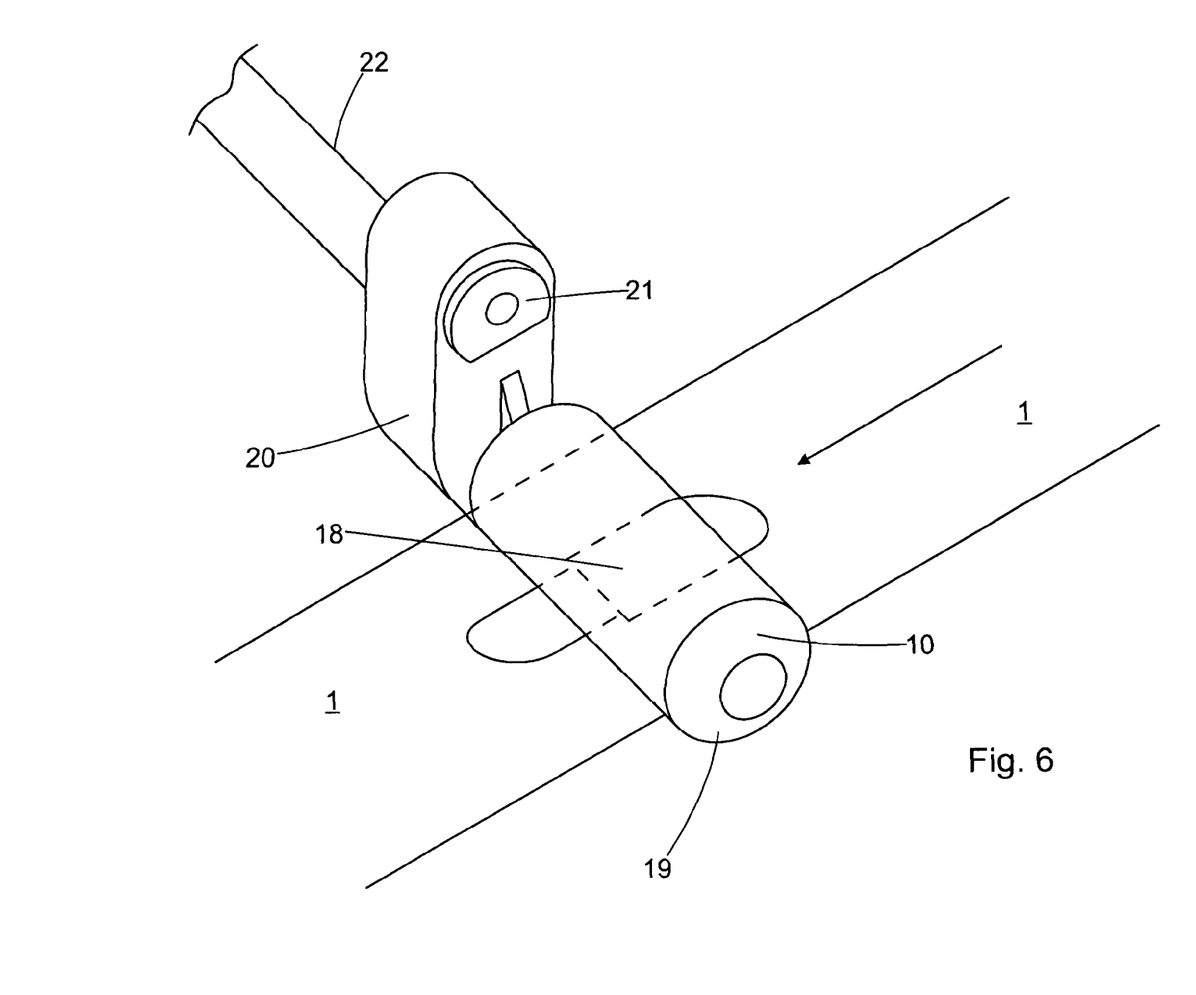
FIG. 6 shows a perspective view of an alternative carrier support that can be used with the sliding member shown in FIG. 3.

An alternative mount for carriers can be seen in FIG. 6 of the accompanying drawings. In this embodiment, the arm 22 on which the carriers are mounted is offset by a crank body 20 from the main body of the trunnion 10, and is held in place by a bushing 21. This arrangement means that the spacing of the carriers will increase as they go round external corners, as explained below.

A conveyor formed out of the sliding members 1 discussed above is shown in FIGS. 4 to 7 of the accompanying drawings. A plurality of sliding members 1 are joined together end-to-end as shown in FIG. 2 of the accompanying drawings to form a pair of parallel endless belts 23. The endless belts pass between a set of pulleys 24, 25, 26, 27, 28, 29 to define a course for the conveyor. A bucket carrier 30 is rotatably mounted between each pair of bushings 13 on sequential pairs of sliding members 1.

The capability of the sliding members 1 to slide over each other along their length (but not otherwise) means that the pitch of the buckets 21 can vary. This is very useful, as it allows the buckets 30 to be brought together to present a continuous surface to loading chute 35 (thus reducing the likelihood of any material deposited into the buckets 30 escaping between the buckets) but whilst still allowing the buckets to separate in order to pivot (for example, in order to negotiate the pulleys, or to rotate so as to release their load at a discharge zone 36). However, given that the endless belts 23 do not bunch or otherwise take up significantly more space at closer pitches, the amount of space required is reduced compared with prior art systems.

To achieve this varying in pitch, it is simply necessary to apply tension or compression to the endless belts, along the length of the belt. When the belts are compressed, it is advisable to contain them within a U-shaped track 51 to ensure that the sliding members 1 move only in the correct direction. About the pulley 24, a nylon shroud 52 provides a surface for the rollers 50 to roll against.

Figure 7A:
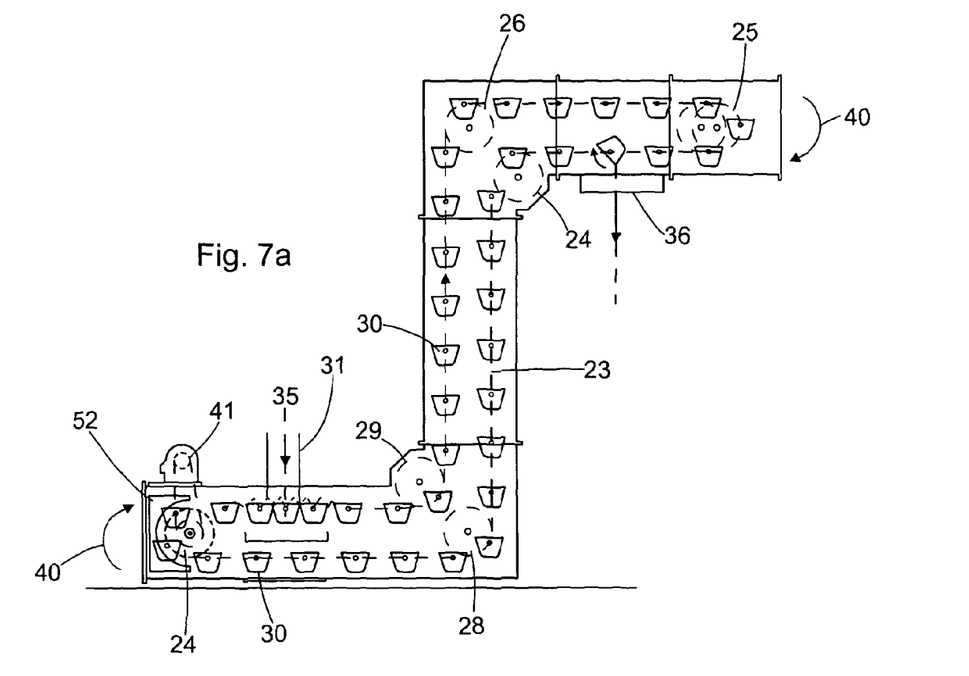
FIGS. 7a to 7c shows a conveyor system according to an embodiment of the invention
Figures 7B, 7C:
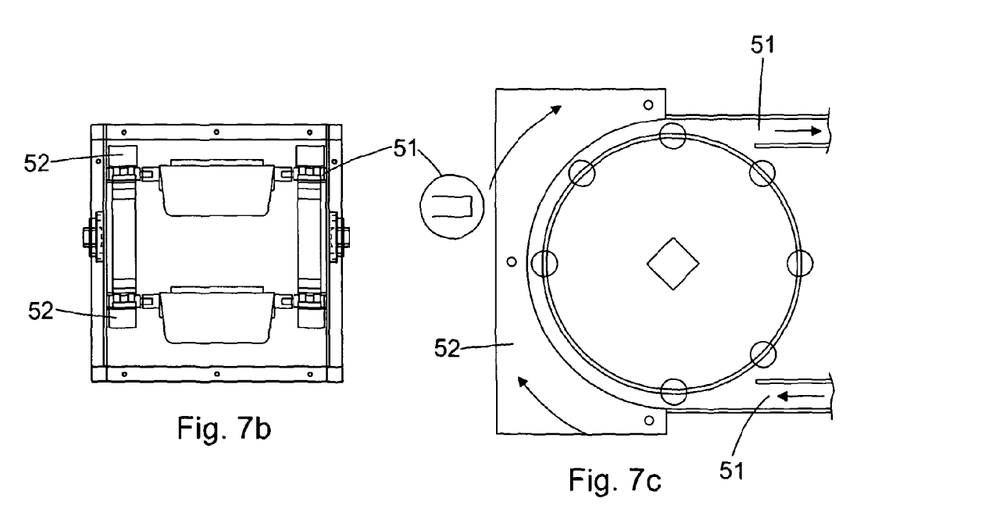

In order to ensure that the buckets 30 bunch together below the loading chute 35, the previous pulley 24 to the loading chute (when considering the direction of travel 40) is the drive pulley, in that it is provided with an electric motor 41. Because this drive pulley 22 is exerting a force in the direction of travel 40, the portion of endless belt 20 between the drive pulley 24 and the next pulley 29 in the direction of travel 32 will be in compression, and so the sliding members 1 will tend to contract together, thus reducing the pitch of the endless belt 23 in this region.

The pulleys 24, 25, 26, 27, 28, 29 are all provided as sprockets, in that they have recesses corresponding to the wheels 50 of the trunnions 13. The spacing of the recesses on the pulleys will be fixed, so that as the endless belts negotiates a given pulley, that will set the pitch of the endless belt at that point. This means that, apart from in the region of the loading chute 35, the endless belt will generally be in tension (due to the force being exerted on the endless belt by the drive pulley 24) and so the endless belts 23 will be at the maximum pitch, with the capping member 6, 6b of each sliding member 1 resting against the bent portion 12 of the following sliding member 1.

This means that, at the discharge zone 36, the buckets 30 can safely be rotated through a whole revolution without them being so close that such rotation will cause them to interfere with one another.

Figure 5A:
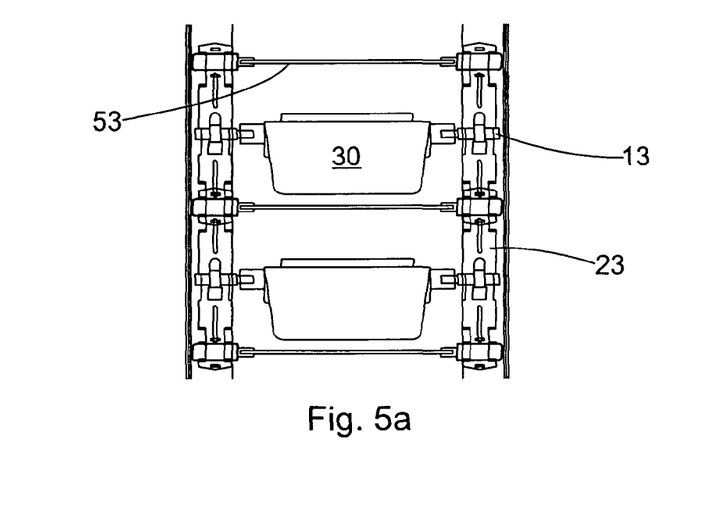
FIGS. 5a to 5c show in exploded perspective view a conveyor system according to an embodiment of the invention.
Figure 5B:
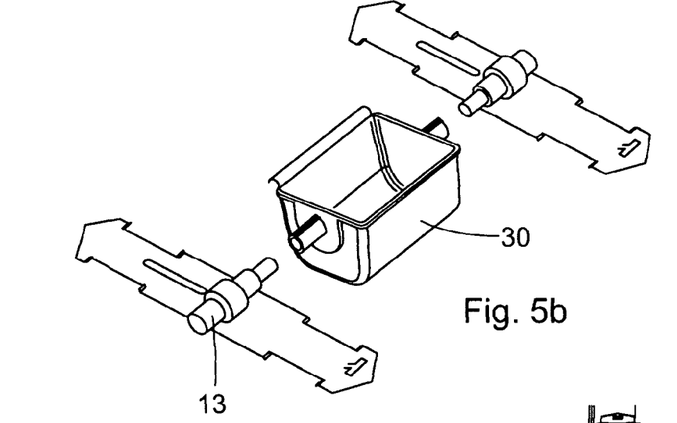
Figure 5C:
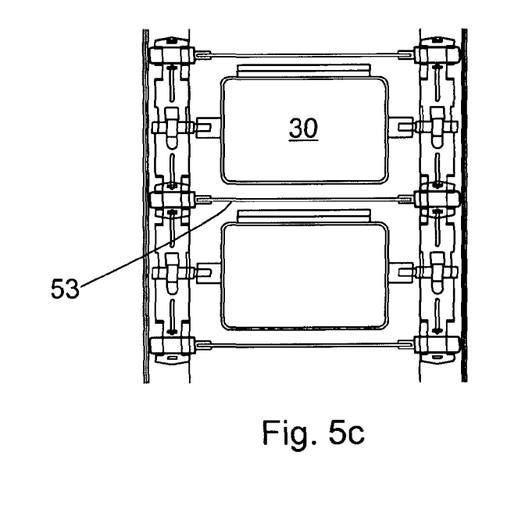

In addition, FIG. 5 shows an embodiment where additional tie bars 53 are provided to link the two endless belts 23 between each bucket 30. This provides for greater rigidity in abnormal or arduous operating conditions. The tie bars 53 each connect a pair of trunnions 13 on the two endless belts 23, with successive pairs of trunnions 13 being connected to a bucket 30 or a tie bar 53.

Figure 8:
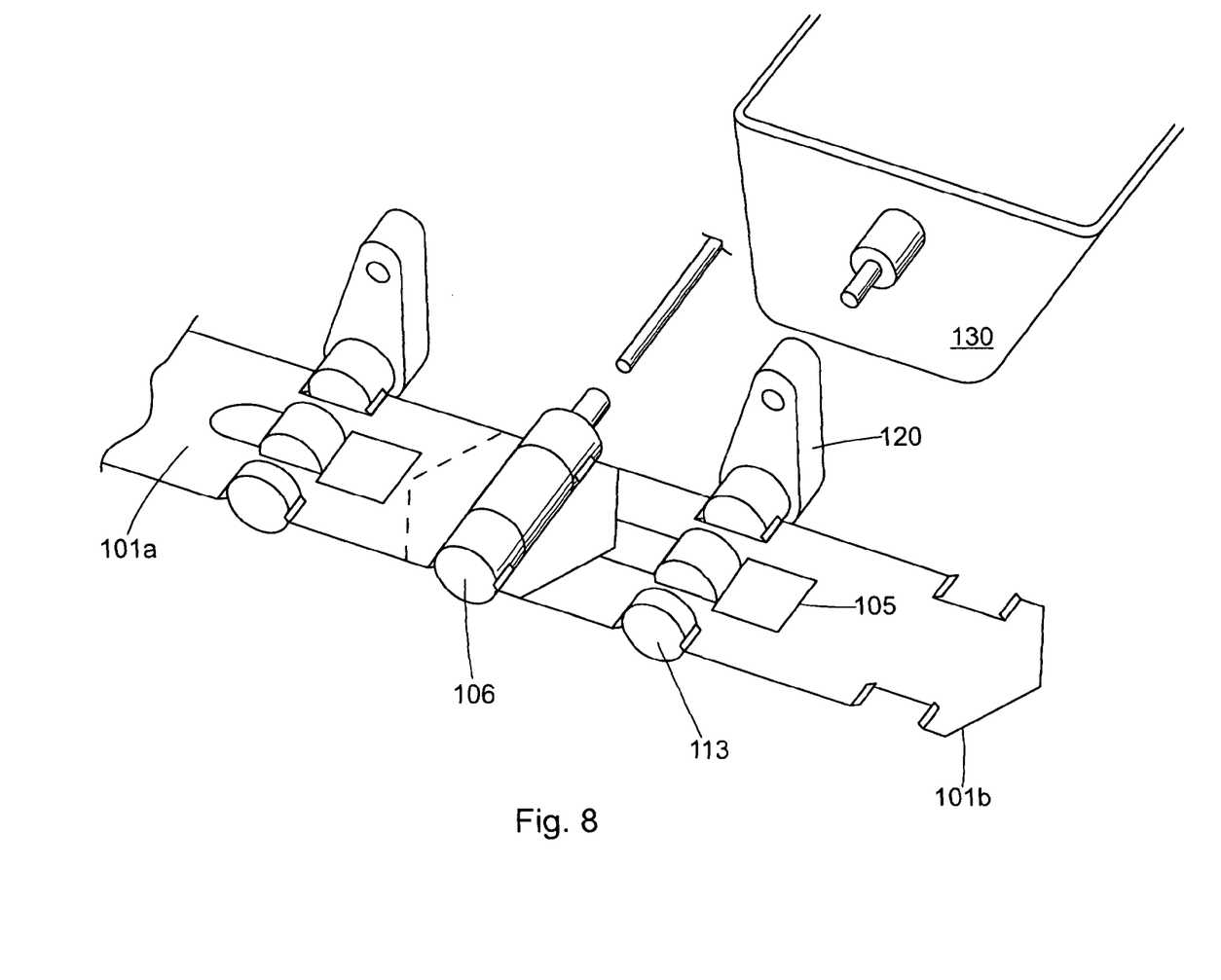
FIG. 8 shows a conveyor according to an alternative embodiment of the invention.

An alternative embodiment of the present invention is shown in FIG. 8 of the accompanying drawings. In this embodiment, features common to the previous embodiments have been given the same reference numerals, raised by 100.

In this embodiment, the previously sliding members of the preceding embodiments (herein simply planar members 101a, 101b) are joined together by means of a fixed coupling 106 which prevents the sliding members from sliding over one another. A carrier 113 is formed as a trunnion in the slot 105, which connects to that slot in the same manner as that shown in FIGS. 3a to 3f of the accompanying drawings. However, the carrier 113 of this embodiment has the cranked arm 120 of FIG. 6.

This means that, if a bucket 130 is connected to the cranked end of the cranked arm (as shown by the dotted line in FIG. 8), as the endless belt formed by connecting a plurality of the members 101a, 101b in a loop passes over a pulley system such as that shown in FIGS. 7a to 7c, negotiating an outside bend such as that round pulley 26 will cause the buckets to separate, thus allowing them to negotiate the corners without interfering with one another. Thus, bends can be used to control the spacing of the buckets.

The invention claimed is:

1. A conveyor comprising an endless belt, the endless belt having a length along which it is endless and comprising a plurality of generally planar sliding members, and a plurality of sliding couplings which couple the sliding members together such that each sliding member is caused to slide over an adjacent sliding member by an assembly configured to apply at least one of tension and compression to the endless belt so as to vary the length of the endless belt.

2. The conveyor of claim 1, in which each of the sliding members is connected to an adjacent sliding member by means of one of the sliding couplings.

3. The conveyor of claim 1, in which a pitch of the sliding couplings when the endless belt is extended to a maximum length is substantially constant.

4. The conveyor of claim 1, in which each sliding coupling comprises at least one first part, attached to a first sliding member, slidably mounted in an elongate slot in a second sliding member.

5. The conveyor of claim 4, in which the elongate slot is entirely within a body of the second sliding member, or is formed in a lateral edge of the sliding member.

6. The conveyor of claim 1, wherein the assembly comprises a set of rotatable pulleys on which the endless belt is mounted, in which the pulleys comprise at least one drive pulley, each drive pulley being provided with a driver configured to drive rotation of the drive pulley and so move the endless belt.

7. The conveyor of claim 1, wherein each of the sliding members is an elongated strip of spring steel.

8. The conveyor of claim 1, wherein the sliding members define a continuous planar surface.

9. The conveyor of claim 8, wherein a majority of the continuous planar surface comprises material of the sliding members which is void of any gaps.

10. The conveyor of claim 1, wherein a lower surface of one of the sliding members slides over an upper surface of another of the sliding members.

11. A conveyor comprising an endless belt, the endless belt having a length along which it is endless and comprising a plurality of generally planar sliding members, and a plurality of sliding couplings which couple the sliding members together such that each sliding member can slide in a direction along the length of the endless belt over an adjacent sliding member so as to vary the length of the endless belt;
- wherein each sliding coupling comprises at least one first part, attached to a first sliding member, slidably mounted in an elongate slot in a second sliding member; and
- at least three such elongate slots, the elongate slots being mutually parallel but noncollinear.

12. The conveyor of claim 11, in which at least one of the slots is displaced along the length of the endless belt from the other slots.

13. A conveyor comprising an endless belt, the endless belt having a length along which it is endless and comprising a plurality of generally planar sliding members, and a plurality of sliding couplings which couple the sliding members together such that each sliding member can slide in a direction along the length of the endless belt over an adjacent sliding member so as to vary the length of the endless belt;
- wherein each sliding coupling comprises at least one first part, attached to a first sliding member, slidably mounted in an elongate slot in a second sliding member; and
- wherein an end of at least one of the slots is provided with an end stop, which protrudes from a plane of the sliding member.

14. A conveyor comprising an endless belt, the endless belt having a length along which it is endless and comprising a plurality of generally planar sliding members, and a plurality of sliding couplings which couple the sliding members together such that each sliding member can slide in a direction along the length of the endless belt over an adjacent sliding member so as to vary the length of the endless belt;
- a set of rotatable pulleys on which the endless belt is mounted, in which the pulleys comprise at least one drive pulley, each drive pulley being provided with a driver configured to drive rotation of the drive pulley and so move the endless belt; and
- wherein the set of rotatable pulleys comprises at least one pair of compression pulleys, which act to compress the endless belt as the endless belt passes between them.

15. A conveyor comprising two endless belts, positioned with their lengths generally parallel to one another, and tie bars connecting the two endless belts at intervals along the length of the conveyor, each endless belt having a length along which it is endless and comprising a plurality of generally planar sliding members, and a plurality of sliding couplings which couple the sliding members together such that each sliding member can slide in a direction along the length of the endless belt over an adjacent sliding member so as to vary the length of the endless belt.

* * * * *